US011995353B2

(12) United States Patent
Basu et al.

(10) Patent No.: US 11,995,353 B2
(45) Date of Patent: May 28, 2024

(54) STORING PARITY DURING REFRESH OPERATIONS

(71) Applicant: Micron Technology, Inc., Boise, ID (US)

(72) Inventors: Reshmi Basu, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 79 days.

(21) Appl. No.: 17/747,676

(22) Filed: May 18, 2022

(65) Prior Publication Data

US 2023/0376243 A1    Nov. 23, 2023

(51) Int. Cl.
*G06F 12/00*    (2006.01)
*G06F 3/06*    (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679

USPC ......................................................... 711/154
See application file for complete search history.

(56) References Cited

U.S. PATENT DOCUMENTS

| 9,747,170 B2 * | 8/2017 | Lee ..................... G06F 12/0246 |
| 2009/0016117 A1 * | 1/2009 | Shibata .............. G11C 16/3436 365/185.18 |
| 2021/0020220 A1 * | 1/2021 | Di Vincenzo ....... G11C 11/2257 |

* cited by examiner

*Primary Examiner* — Mardochee Chery
(74) *Attorney, Agent, or Firm* — Holland & Hart LLP

(57) ABSTRACT

Methods, systems, and devices for storing parity during refresh operations are described. In some examples, refresh operations may be performed on a memory device when the memory device is idle. For example, a refresh operation may entail performing a logical operation on first data and a first set of parity bits and second data and a second set of parity bits. The logical operation may generate a third set of parity bits which may be used for data retention purposes. Moreover, during a read operation, the third set of parity bits may be used to recover corrupt or otherwise invalid data in the event of an error.

24 Claims, 11 Drawing Sheets

STORING PARITY DURING REFRESH OPERATIONS

FIELD OF TECHNOLOGY

The following relates to one or more systems for memory, including storing parity during refresh operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
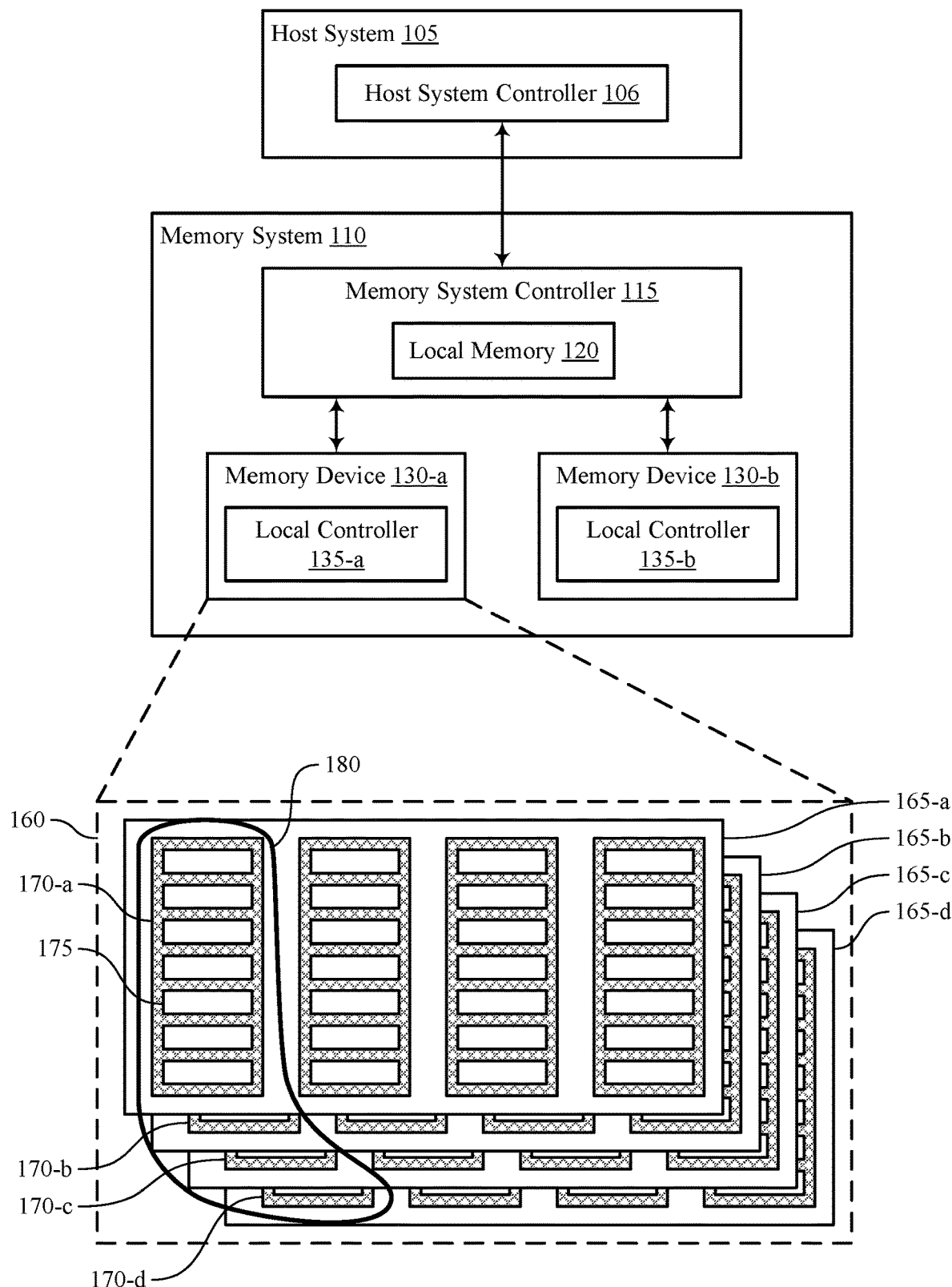
FIG. 1 illustrates an example of a system that supports storing parity during refresh operations in accordance with examples as disclosed herein.

In some memory devices, memory cells may be operable to store either a single bit of data or multiple bits of data. Memory cells operable to store a single bit of data may be referred to as single-bit memory cells (e.g., single-level cells (SLCs)) and memory cells configured to store two or more bits of data may be referred to as multi-bit memory cells (e.g., multi-level cells (MLCs), tri-level cells (TLCs) or quad-level cells (QLCs)). Although in some cases MLC may refer to storing two bits of data, MLC is intended to refer herein to any multi-bit memory cell. In some cases, data written to MLCs may be susceptible to errors and thus certain data protection schemes may be employed for data retention purposes. However, in some instances, such data protection schemes may increase latency and otherwise decrease the overall performance of the memory device. Accordingly, a memory device configured to employ a data protection scheme without negatively affecting its overall performance may be beneficial.

A memory device configured to employ certain data protection schemes is described herein. For example, some memory devices may implement a redundant array of independent NAND (RAIN) data protection scheme for data retention purposes. In such examples, a logical operation may be performed on certain sets (e.g., stripes) of data, and the resulting bits (e.g., the resulting parity bits) may be stored to the memory device. In other examples, and as described herein, a logical operation may be performed on respective sets of data and associated parity bits, which improve the memory device's ability to correct errors and retain data without affecting its latency and overall performance. Such logical operations may be referred to as turbo RAIN operations. Storing data using turbo RAIN can increase latency of write operations, because both the data and associated turbo RAIN parity are stored using separate MLC write operations.

As described herein, turbo RAIN operations may be performed when a memory device is idle (e.g., when an activity level of an interface between the memory device and a host device does not satisfy a threshold). For example, when the memory device is idle, a turbo RAIN operation may be performed on blocks of memory cells designated for a refresh operation. When refreshing the blocks, a logical operation may be performed on a first block of memory cells that stores first data and a first set of parity bits (e.g., a first set of parity bits generated using the first data) and a second block of memory cells that stores second data and a second set of parity bits. The logical operation may result in a third set of parity bits being generated, which may be stored to the memory device. In the event that an error (or a large quantity of errors) associated with the first data or the second data occurs, logical operation may be performed using the third set of parity bits to recover the corrupted data. Accordingly, such a data protection scheme may provide enhanced error correction capabilities without affecting the memory device's latency and overall performance.

Figure 2:
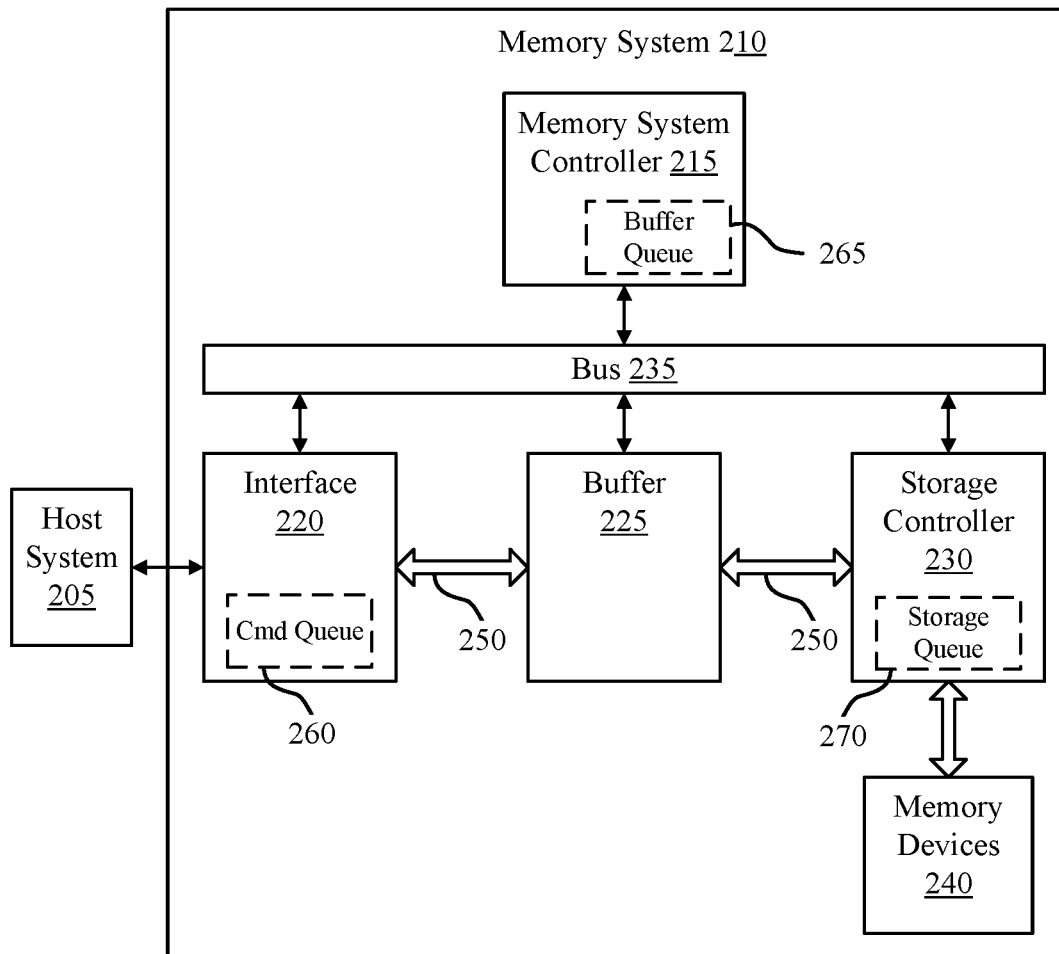
FIG. 2 illustrates an example of a system that supports storing parity during refresh operations in accordance with examples as disclosed herein.

Features of the disclosure are initially described in the context of systems and devices with reference to FIGS. 1 and 2. Features of the disclosure are described in the context of a system and flow diagrams with reference to FIGS. 3-5. These and other features of the disclosure are further illustrated by and described in the context of an apparatus diagram and flowchart that relate to storing parity during refresh operations with reference to FIGS. 6-11.

FIG. 1 illustrates an example of a system 100 that supports storing parity during refresh operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support storing parity during refresh operations. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the host system 105 may transmit one or more write commands to the memory system 110. The write command may include data to be written to one or more memory cells of a memory device 130-a. In some instances, the memory system 110 may employ a force-SLC write scheme, where the data is first written to one or more blocks 170 that are being operated as SLCs (e.g., the data may be written using a first type of write operation). For example, the data may be written to one or more blocks 170 of the memory device 130-a that are being operated as SLCs. Additionally or alternatively, the data may also be written to one or more blocks 170 of the memory device 130 that are being operated as MLCs (e.g., the data may be written using a second type of write operation). A first set of parity bits associated with the data may also be written to the blocks 170 being operated as MLCs. Upon writing the data and the first set of parity bits to the one or more blocks 170 being operated as MLCs, the memory system controller 115 may designate the respective blocks 170 being operated as MLCs for a refresh operation.

The memory system controller 115 may monitor an interface between the host system 105 and the memory system 110 to determine when the memory system 110 is idle. When the memory system 110 is idle (e.g., when an activity level of the interface does not satisfy a threshold activity level), a refresh operation may be performed on the blocks 170 being operated as MLCs. To perform the refresh operation, the memory system controller 115 may perform a logical operation on the data and first set of parity bits written to the MLCs and second data (e.g., different data) and a second set of parity bits associated with the second data. The refresh operation may result in a third set of parity bits being generated, which may be stored to one or more cells of a memory device 130 and may be used for error correction and data retention purposes. In some examples, after generating the third set of parity bits, the data written to the one or more blocks 170 being operated as SLCs may be erased.

Alternatively to the force-SLC write scheme, the memory system 110 may not utilize a force-SLC write scheme and other schemes for performing refresh operations on blocks 170 of memory cells may be employed. In any scheme, however, performing refresh operations on blocks 170 of memory cells while the memory system 110 is idle may provide enhanced error correction capabilities without affecting the memory device's 110 latency and overall performance.

FIG. 2 illustrates an example of a system 200 that supports storing parity during refresh operations in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the host system 205 may transmit one or more write commands to the memory system 210. The write command may include data to be written to one or more memory cells of a memory device 240. In some instances, the memory system 110 may employ a force-SLC write scheme, where the data is first written to one or more blocks that are being operated as SLCs (e.g., the data may be written using a first type of write operation). Additionally or alternatively, the data may also be written to one or more blocks of the memory device 240 that are being operated as MLCs (e.g., the data may be written using a second type of write operation). A first set of parity bits associated with the data may also be written to the blocks being operated as MLCs. Upon writing the data and the first set of parity bits to the one or more blocks being operated as MLCs, the memory system controller 215 may designate the respective blocks being operated as MLCs for a refresh operation.

The memory system controller 215 may monitor an interface between the host system 205 and the memory system 210 to determine when the memory system 210 is idle. When the memory system 210 is idle (e.g., when an activity level of the interface does not satisfy a threshold activity level), a refresh operation may be performed on the blocks being operated as MLCs. To perform the refresh operation, the memory system controller 215 may perform a logical operation on the data and first set of parity bits written to the MLCs and second data (e.g., different data) and a second set of parity bits associated with the second data. The refresh operation may result in a third set of parity bits being generated, which may be stored to one or more cells of a memory device 240 and may be used for error correction and data retention purposes. In some examples, after generating the third set of parity bits, the data written to the one or more blocks being operated as SLCs may be erased.

Alternatively to the force-SLC write scheme, the memory system 210 may not utilize a force-SLC write scheme and other schemes for performing refresh operations on blocks of memory cells may be employed. In any scheme, however, performing refresh operations on blocks of memory cells while the memory system 210 is idle may provide enhanced error correction capabilities without affecting the memory device's 210 latency and overall performance.

Figure 3:
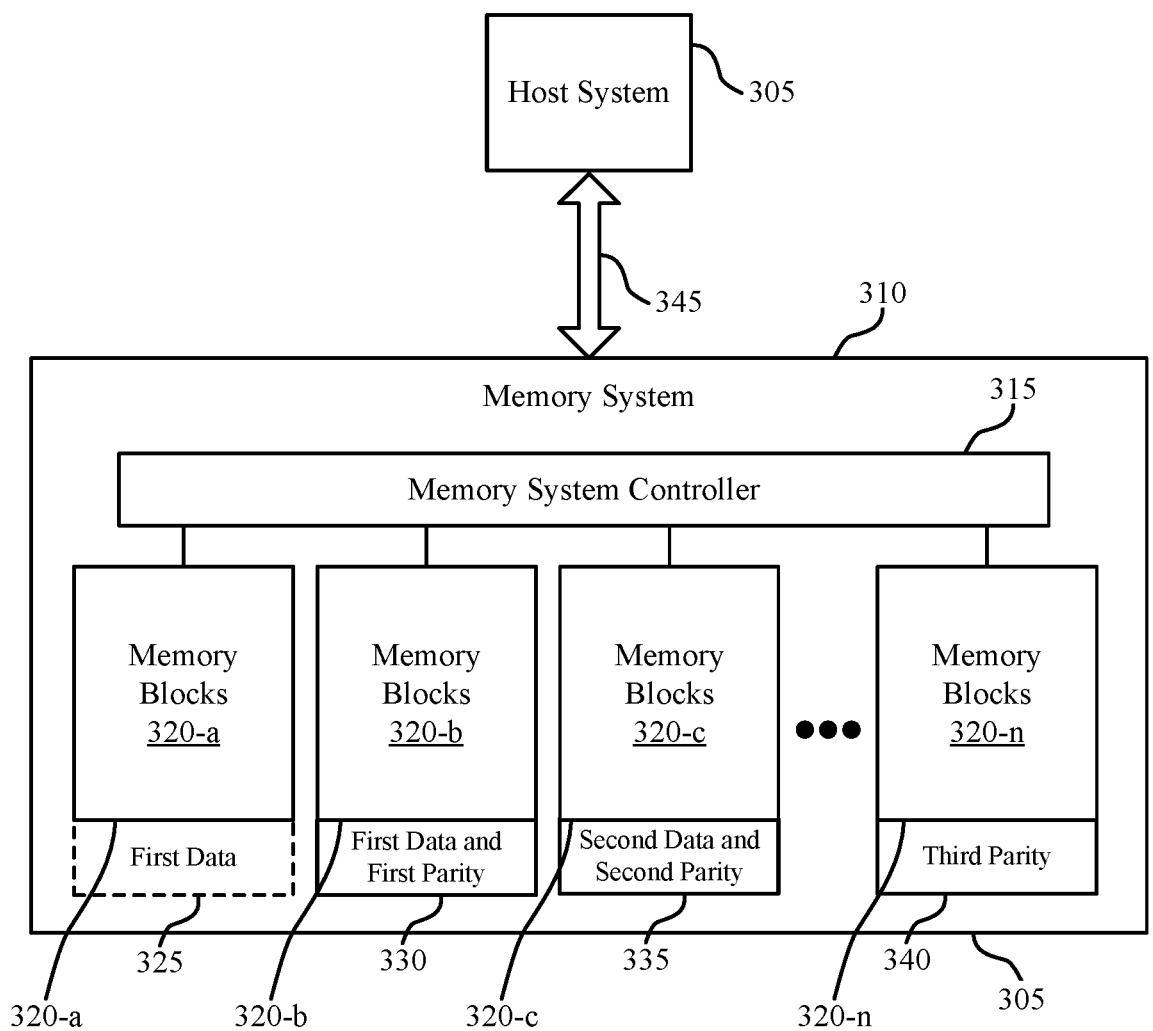
FIG. 3 illustrates an example of a system that supports storing parity during refresh operations in accordance with examples as disclosed herein.

FIG. 3 illustrates an example of a system 300 that supports storing parity during refresh operations in accordance with examples as disclosed herein. The system 300 may be an example of the system 200 as described with reference to FIG. 2 and may include a host system 305 and a memory system 310. In some examples, the host system 305 may be coupled with the memory system 310 via an interface 345. The memory system 310 may include memory blocks 320-a through 320-n. The memory blocks 320 may be associated with a same memory device or, in some examples, may be associated with different memory devices of the memory system 310. For example, the memory blocks 320-a may be associated with a first memory device and the memory blocks 320-b may be associated with a second memory device (e.g., a different memory device, a different memory die). Additionally or alternatively, each memory block 320 may include one or more memory cells, and the memory cells of different memory blocks 320 may be operated as different types of memory cells. For exemplary purposes only, the memory cells of the memory blocks 320-a may be operated as SLCs and the memory cells of the memory blocks 320-b and 320-c may be operated as MLCs. The system 300 may support performing refresh operations on blocks of memory cells while the memory system 310 is idle (e.g., while an activity level of the interface 345 does not satisfy a threshold), which may provide enhanced error correction capabilities without affecting the memory system's latency and overall performance.

The memory system controller 315 may perform various operations associated with the memory system 310. For example, the memory system controller 315 may receive commands (e.g., read commands, write commands), read data from and write data to various memory blocks 320, monitor an activity level of the interface 345, designate memory blocks 320 for refresh operations, and perform refresh operations on the memory blocks 320, among other operations. In some examples, the memory system controller 315 may be coupled (e.g., coupled indirectly) with the memory blocks 320 and may be configured to write data to one or more blocks 320 and perform refresh operations on one or more blocks 320 based on an activity level of the interface 345.

As described herein, each of the blocks 320 may include one or more memory cells, and each of the memory cells of the memory system 310 may be operated as SLCs or MLCs. That is, each of the memory cells may include a same physical structure but, based on a type of write operation performed by the memory system controller 315, may store a different quantity of bits. For example, a memory cell may store a single bit of data when the memory system controller 315 performs a first type of write operation and may store two or more bits (e.g., multiple bits) of data when the memory system controller 315 performs a second type of write operation. Whether a certain memory cell (or a certain memory block 320) is operated as a SLC or MLC may be a matter of design choice. For exemplary purposes only, the memory cells of the memory block 320-a may be operated as SLCs and the memory cells of the memory blocks 320-b and 320-c may be operated as MLCs. Thus, when memory cells are referred to as SLCs or MLCs, it should be understood to refer to memory cells programmed with an SLC operation or an MLC operation, respectively.

The memory system controller 315 may employ a turbo RAIN scheme to improve data retention, prevent data access errors, and add additional protection to data stored at the memory blocks 320. For example, the memory system controller 315 may utilize the turbo RAIN scheme to generate parity bits (e.g., third parity bits) that are based on respective sets of data (e.g., first data and second data) and parity bits (e.g., first parity bits and second parity bits that are associated with the first data and the second data, respectively). As described herein, a turbo RAIN operation may be performed during a refresh operation, which may occur when the memory system 310 is idle (e.g., when the activity level of the interface 345 does not satisfy a threshold). Accordingly, the latency and overall performance of the memory system 310 may not be negatively impacted.

In some examples, whether data is stored to SLCs, MLCs, or both may be a matter of design choice or may be dependent upon whether the memory system 310 is active or idle. For example, if the memory system 310 is idle (e.g., if the interface 345 is idle) then the data may be written directly to MLCs and a turbo RAIN operation may be performed on the data (e.g., RAIN parity may be generated upon the data being written to the MLCs). However, in other examples, if the memory system 310 is not idle (e.g., if the interface 345 is active) then the data may either be stored only to SLCs, stored only to MLCs, or stored to both SLCs and MLCs (e.g., the same data may be stored to both SLCs and MLCs). Accordingly, in such examples when the memory system 310 is not idle, a refresh operation may be postponed and performed on the associated memory cells when the memory system 310 is idle.

As used herein, the interface 345 may be idle based on an absence of commands received from the host system 305, based on a queue depth (e.g., a depth of a queue associated with the memory system controller 315), based on a threshold quantity of commands being processed or in the queue, or another metric. For example, if based on a queue depth, the interface 345 may be idle when the memory system controller 315 is processing a command but the queue is empty (or contains less than a threshold quantity of commands).

In a first example, the host system 305 may transmit a write command that includes first data to the memory system 310. The write command may be queued and, while the write command is in the queue, the memory system controller 315 may determine that the memory system 310 is idle. Accordingly, the memory system controller 315 may generate a first set of parity bits associated with the first data and may write the first data and the first set of parity bits 330 to one or more MLCs of the memory blocks 320-*b*.

Upon writing the first data and the first set of parity bits 330 to the MLCs of the memory blocks 320-*b*, the memory system controller 315 may generate a third set of parity bits 340 using the first data and the first set of parity bits 330 and second data and a second set of parity bits 335 (e.g., stored to the memory blocks 320-*c*). As described herein, the second data and the second set of parity bits 335 may be stored to a same or a different memory device as the first data and the first set of parity bits 330 and may have been generated during a prior operation. For example, during a prior operation, the first set of parity bits 330 may have been generated using the first data (e.g., by using an error correction code) and the second set of parity bits 335 may have been generated using the second data (e.g., by using an error correction code).

Additionally or alternatively, the third set of parity bits 340 may be stored to a same or a different memory device as the first data and the first set of parity bits 330 and the second data and the second set of parity bits 335. Moreover, the third set of parity bits 340 may be generated by performing a logical operation, such as an exclusive-or (XOR) operation, on the first data and the first set of parity bits 330 and the second data and the second set of parity bits 335. That is, the first data (that is combined with the first set of parity bits 330) may be XOR'ed with the second data (that is combined with the second set of parity bits 335) to generate the third set of parity bits 340.

In a second example, the host system 305 may transmit a write command that includes first data to the memory system 310. The write command may be queued and, while the write command is in the queue, the memory system controller 315 may determine that the memory system 310 is active (e.g., not idle). As used herein, the interface 345 may be active based on one or more commands being received from the host system 305, based on a queue depth (e.g., a depth of a queue associated with the memory system controller 315), based on a threshold quantity of commands being processed or in the queue, or another metric. For example, if based on a queue depth, the interface 345 may be active when the memory system controller 315 is processing a command or includes at least a threshold quantity of commands in the queue.

Accordingly, the memory system controller 315 may write the first data 325 (and, optionally, a first set of parity bits) to one or more SLCs of the memory blocks 320-*a*. That is, because the memory system 310 may a high enough read margin (e.g., the data may be frequently-accessed or may be accessed within a duration), the memory system controller 315 may not generate the third set of parity bits and may instead only write the first data 325 (and, optionally, the first set of parity bits) to the SLCs of the memory blocks 320-*a*. For example, because SLCs have a higher inherent read margin than MLCs, if accessed within a given duration, SLCs will maintain a failure rate below a threshold.

In some instances, when the memory system 310 becomes idle, the memory system controller 315 may perform a refresh operation on the data written to the SLCs. Accordingly, the first data 325 may be written (e.g., folded) into the MLCs and the memory system controller 315 may subsequently generate the third set of parity bits 340 using the first data and the first set of parity bits 330. The memory system controller 315 may store the third set of parity bits 340 (e.g., into a memory block other than the memory block 320-*b* or the memory block 320-*c*).

In another example, the host system 305 may transmit a write command that includes first data to the memory system 310. The write command may be queued and, while the write command is in the queue, the memory system controller 315 may determine that the memory system 310 is active (e.g., not idle). Accordingly, the memory system controller 315 may generate a first set of parity bits associated with the first data and may write the first data and the first set of parity bits 330 to one or more MLCs of the memory blocks 320-*b*. In such an example, the memory system 310 may have a high enough read margin that, if the first data and the first set of parity bits are only being stored for a duration (e.g., a relatively limited duration), then the memory system controller 315 may not generate the third set of parity bits 340. However, in other examples, if the read margin is not high enough then the memory system controller 315 may designate the memory cells for a refresh operation and may generate the third set of parity bits 340 using the first data and the first set of parity bits 330 and the second data and the second set of parity bits 335 when the memory system 310 is idle.

In yet another example, the host system 305 may transmit a write command that includes first data to the memory system 310. The write command may be queued and, while the write command is in the queue, the memory system controller 315 may determine that the memory system 310 is active (e.g., not idle). Accordingly, the memory system controller 315 may generate a first set of parity bits associated with the first data and may write the first data and the first set of parity bits 330 to one or more MLCs of the memory blocks 320-*b*. In some instances, the memory system 310 may utilize one or more cursors for writing data and may utilize one cursor (e.g., a first cursor) to write the first set of parity bits 330 to one or more MLCs of the memory blocks 320-*b*. The memory system controller 315 may also write the first data 325 (e.g., a copy of the first data 325) to one or more SLCs of the memory blocks 320-*a*. In some examples, the memory system 310 may utilize another cursor (e.g., a second cursor) to write the first data 325 (e.g., a copy of the first data 325) to one or more SLCs of the memory blocks 320-*a*. In some instances, the operations performed by the first cursor and the second cursor may occur during a same duration.

Upon writing the first data and the first set of parity bits 330 to the MLCs of the memory blocks 320-*b* and a copy of the first data 325 to the SLCs of the memory blocks 320-a, the memory system controller 315 may designate the MLCs for a refresh operation. Accordingly, when the memory system 310 is idle, the memory system controller 315 may generate a third set of parity bits 340 using the first data and the first set of parity bits 330 and second data and a second set of parity bits 335 (e.g., stored to the memory blocks 320-c). The third set of parity bits 340 may be generated by performing an XOR operation as described herein. After the third set of parity bits 340 are stored, the memory system controller 315 may delete (e.g., erase) the copy of the first data 325 from the SLCs.

In some instances, read operations may also be performed on the memory system 310. For example, the host system 305 may transmit a read command for the first data to the memory system 310. Upon receiving the read command, the memory system controller 315 may first determine whether the first data is stored to the SLCs (e.g., the SLCs of the memory block 320-a). If the first data is stored to the SLCs, the memory system controller 315 may read the first data from the SLCs and the read command may be satisfied. If, however, the first data is not stored to the SLCs, the memory system controller 315 may read the first data from the MLCs (e.g., the MLCs of the memory block 320-b). In some examples, the memory system controller 315 (or another component of the memory system 310) may perform an error detection operation on the first data using the first set of parity bits.

If, when performing a read operation, the read fails, the memory system controller 315 may recover the data using the third set of parity bits 340 (e.g., the RAIN parity). A read operation may fail, for example, based on the third set of parity bits 340 failing to match a set of parity bits during a low-density parity check (LDPC) operation. To recover the data using the third set of parity bits 340, the memory system controller 315 may utilize an algorithm (e.g., perform an XOR operation), on the third set of parity bits 340 and the second data and the second set of parity bits 335 to recover the first data and the first set of parity bits. In some examples, another LDPC operation may be performed on the recovered first set of parity bits to ensure that the first data is without errors. By performing refresh operations on memory blocks 320 as described herein, the memory system 310 may have enhanced error correction capabilities without affecting its latency and overall performance.

Figure 4:
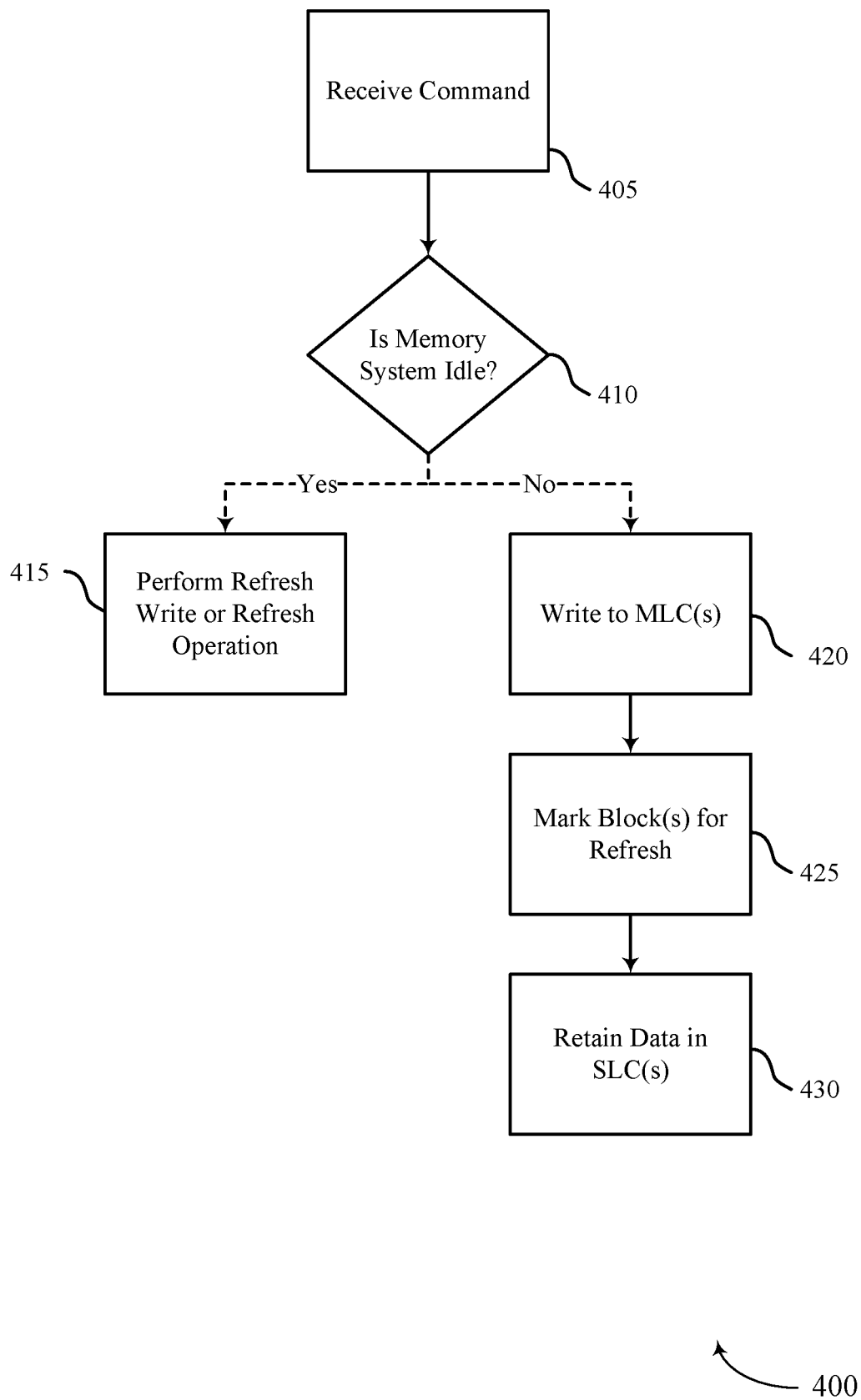
FIG. 4 illustrates an example of a flow diagram that supports storing parity during refresh operations in accordance with examples as disclosed herein.

FIG. 4 illustrates an example of a flow diagram 400 that supports storing parity during refresh operations in accordance with examples as disclosed herein. The flow diagram 400 may illustrate an example of a write operation or a refresh operation as described above with reference to FIG. 3. For example, the write operation illustrated by the flow diagram 400 may be performed on a memory system 310 and may occur in response to a write command being received from a host system 305. In other examples, the flow diagram 400 may illustrate a refresh operation and may occur in response to an internal command (e.g., a refresh command) being generated or received by a memory system controller 315. By performing write operations and refresh operations on memory blocks (e.g., memory blocks 320 as described with reference to FIG. 3), a memory system may have enhanced error correction capabilities without affecting its latency and overall performance.

At 405, a memory system (e.g., a memory system 310 as described with reference to FIG. 3) may receive a write command from a host system (e.g., a host system 305 as described with reference to FIG. 3). In some instances, the write command may be received by a memory system controller (e.g., a memory system controller 315 as described with reference to FIG. 3) and may be associated with or may include first data. In some instances, upon receiving the write command, the memory system controller may optionally generate a first set of parity bits using an error correction code (ECC). In other examples, the memory system controller may generate the first set of parity bits upon determining to write the first data to one or more SLCs or one or more MLCs.

At 410, the memory system controller may determine whether the memory system is active or idle. For example, the memory system may be active or idle based on an activity level of an interface (e.g., an interface 345 as described with reference to FIG. 3). The memory system may be idle when the activity level of the interface does not satisfy (e.g., fails to satisfy) a threshold value and the memory system may be active when the activity level satisfies the threshold value.

At 415, the memory system controller may perform a refresh write operation if the memory device is idle. To perform a refresh write operation, the memory system controller may generate a first set of parity bits associated with the first data (e.g., if not already performed as described with reference to step 405) and may perform a logical operation on the first data and first set of parity bits and second data and a second set of parity bits. In some instances, the logical operation may be or may include an XOR operation and may result in a third set of parity bits (e.g., a set of RAIN parity bits) being generated. As described with reference to FIG. 3, the third set of parity bits may be stored to one or more blocks of memory cells and may be used for data recovery purposes.

At 420, the memory system controller may write the first data to one or more MLCs. The memory system controller may also generate a first set of parity bits associated with the first data (e.g., if not already performed as described with reference to step 405) and may store the first set of parity bits with the first data. Although not shown in FIG. 4, the memory system controller may also store a copy of the first data in one or more SLCs (e.g., as described with reference to FIG. 3). Whether the first data is stored at MLCs, SLCs, or both may be a matter of design choice and may depend on the read margin associated with the data (e.g., for SLCs, for MLCs).

At 425, upon writing the first data to one or more MLCs, the memory system controller may designate (e.g., mark) the block of MLCs for a refresh operation. Accordingly, although not shown in FIG. 4, the memory system controller may perform a refresh operation on the block of MLCs when the memory system transitions from being active to being idle (e.g., when the activity level of the interface fails to satisfy the threshold value). At 430, the first data may be retained in the SLCs at least until a refresh operation is performed on the block of MLCs. In some instances, upon the refresh operation being performed, the copy of the first data may be erased (e.g., deleted) from the SLCs.

Alternatively, as described above, the flow diagram 400 may illustrate a refresh operation and may occur in response to an internal command (e.g., a refresh command) being generated or received by a memory system controller. Thus, at 405, the memory system controller may generate a refresh command. At 410, the memory system controller may determine that the memory system is idle and, at 415, may perform a refresh operation based on the refresh command being generated and the memory system being idle. In some instances, the refresh operation may be performed on the blocks of MLCs designated for refresh commands at 425.

For example, after the blocks of MLCs are designated for a refresh operation, a copy of the associated data may be retained in one or more SLCs (e.g., at 430). When the refresh operation is performed, the memory system controller may perform a logical operation on the first data and the associated first set of parity bits that is stored to the block of MLCs and second data and a second set of parity bits. In some instances, the logical operation may be or may include an XOR operation and may result in a third set of parity bits (e.g., a set of RAIN parity bits) being generated. The third set of parity bits may be stored to one or more blocks of memory cells and may be used for data retention purposes. Moreover, upon performing the refresh operation to generate the third set of parity bits, the copy of the first data stored to the block of SLCs may be erased. By performing refresh operations on memory blocks as described herein, the memory system may have enhanced error correction capabilities without affecting its latency and overall performance.

Figure 5:
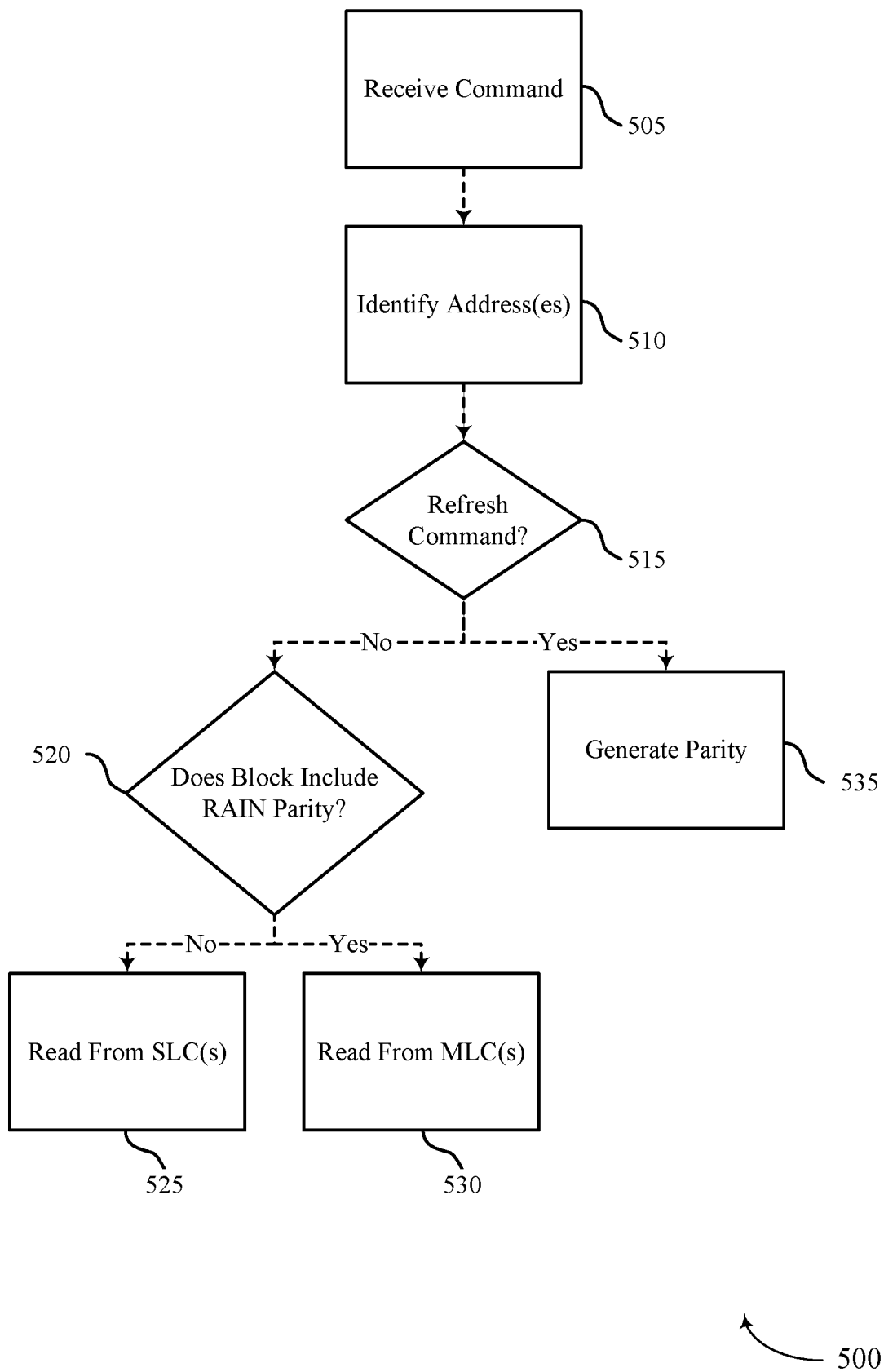
FIG. 5 illustrates an example of a flow diagram that supports storing parity during refresh operations in accordance with examples as disclosed herein.

FIG. 5 illustrates an example of a flow diagram 500 that supports storing parity during refresh operations in accordance with examples as disclosed herein. The flow diagram 500 may illustrate an example of a read operation or a refresh operation as described above with reference to FIG. 3. For example, the read operation illustrated by the flow diagram 500 may be performed on a memory system 310 and may occur in response to a read command being received from a host system 305. In other examples, the flow diagram 500 may illustrate a refresh operation and may occur in response to an internal command (e.g., a refresh command) being generated or received by a memory system controller 315. By performing read operations and refresh operations on memory blocks (e.g., memory blocks 320 as described with reference to FIG. 3), a memory system may have enhanced error correction capabilities without affecting its latency and overall performance.

At 505, a memory system (e.g., a memory system 310 as described with reference to FIG. 3) may receive a read command from a host system (e.g., a host system 305 as described with reference to FIG. 3). In some instances, the read command may be received by a memory system controller (e.g., a memory system controller 315 as described with reference to FIG. 3) and may be associated with first data (e.g., the read command may be for first data stored to the memory system).

At 510, the memory system controller may identify one or more physical addresses that correspond to the requested data (e.g., the data requested by the read command at 505). In some instances, the one or more physical addresses may be associated with one or more SLCs, one or more MLCs, one or more SLCs and MLCs, or one or more MLCs associated with RAIN parity. In some examples, the memory system controller may identify the one or more physical addresses based on an address (e.g., a logical block address (LBA)) included in the read command. For example, the memory system controller may determine a physical address of the memory system associated with the read command using a L2P table.

At 515, the memory system controller may determine whether the command is a refresh command. At 520, if the command is not a refresh command, the memory system controller may determine whether the identified physical address (e.g., the physical address identified at 510) includes RAIN parity (e.g., a third set of parity bits).

At 525, if the identified physical address does not include RAIN parity, the memory system controller may read the first data from one or more SLCs (or one or more MLCs in the event that the identified physical address corresponds to one or more MLCs). In some instances, the first data read from the SLCs may be a copy of the first data as described herein. That is, if the identified MLCs do not include RAIN parity, the block may not have been refreshed. Accordingly, the first data may be stored to both SLCs and to MLCs but the first data may be read from the SLCs for latency, performance, and reliability reasons.

At 530, if the identified physical address includes RAIN parity, the memory system controller may read the first data from the block of MLCs. That is, if the identified MLCs include RAIN parity, the block may have been refreshed. Accordingly, the first data may be read from the block of MLCs for retention and reliability reasons.

Alternatively, as described above, the flow diagram 500 may illustrate a refresh operation and may occur in response to an internal command (e.g., a refresh command) being generated or received by a memory system controller. Thus, at 505, the memory system controller may generate a refresh command. At 510, the memory system controller may identify a block to be refreshed (e.g., based on the refresh command) and, at 535, may perform a refresh operation based on the refresh command being generated and the memory system being idle. In some instances, the refresh operation may be performed on the blocks of MLCs designated for refresh commands. In other examples, the refresh operation may also be performed on blocks of SLCs designated for refresh commands in the event that data was only stored to one or more SLCs during a write operation.

For example, after a block of MLCs is designated for a refresh operation, a copy of the associated data may be retained in one or more SLCs. When the refresh operation is performed, the memory system controller may perform a logical operation on the first data and first set of parity bits (e.g., stored to the block of MLCs) and second data and a second set of parity bits (e.g., stored to a same or a different block of memory cells). In some instances, the logical operation may be or may include an XOR operation and may result in a third set of parity bits (e.g., a set of RAIN parity bits) being generated. The third set of parity bits may be stored to one or more blocks of memory cells and may be used for data retention purposes. Moreover, upon performing the refresh operation to generate the third set of parity bits, the copy of the first data stored to the block of SLCs may be erased. By performing refresh operations on memory blocks as described herein, the memory system may have enhanced error correction capabilities without affecting its latency and overall performance.

Figure 6:
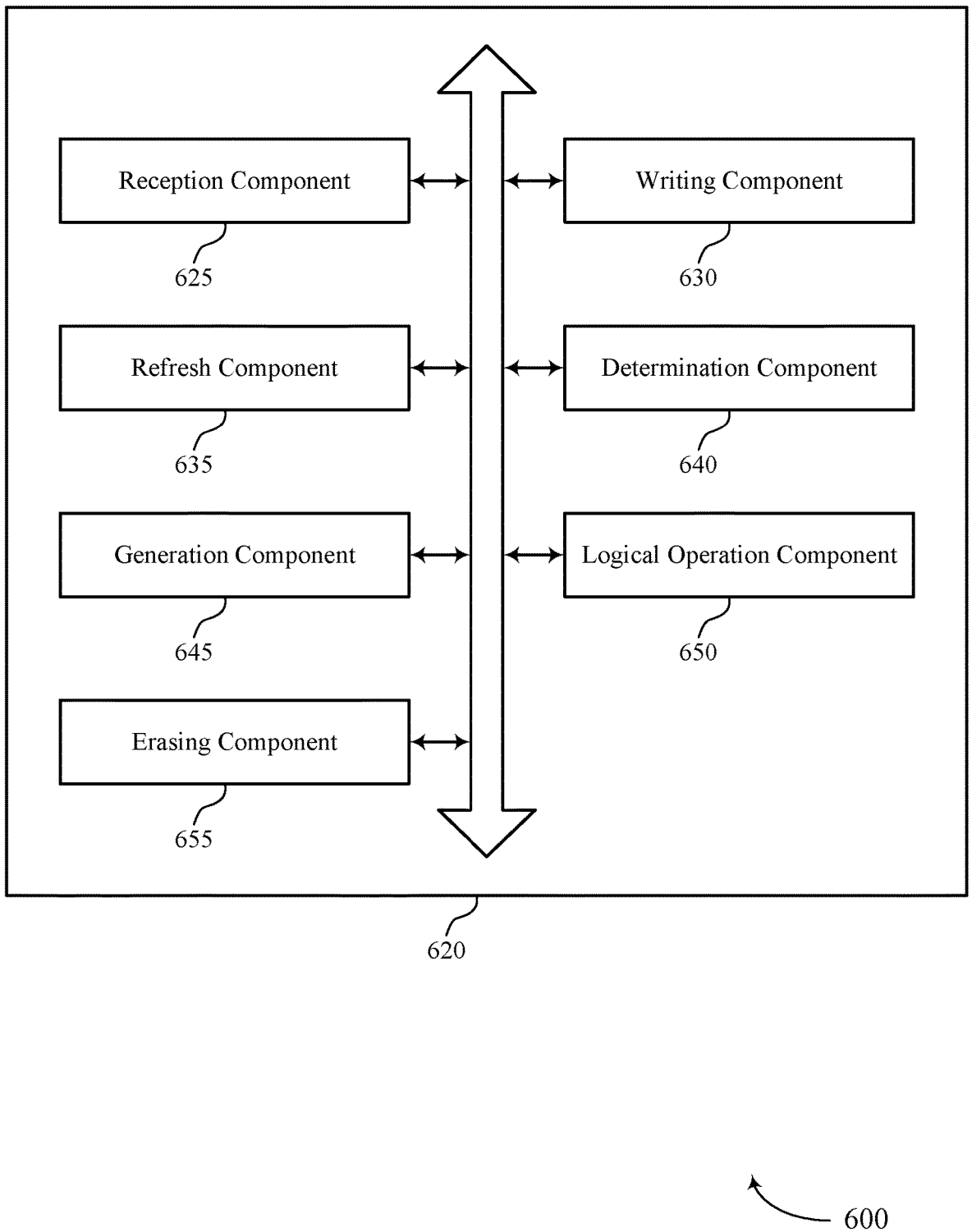
FIG. 6 shows a block diagram of a memory system controller that supports storing parity during refresh operations in accordance with examples as disclosed herein.

FIG. 6 shows a block diagram 600 of a memory system controller 620 that supports storing parity during refresh operations in accordance with examples as disclosed herein. The memory system controller 620 may be an example of aspects of a memory system controller as described with reference to FIGS. 1 through 5. The memory system controller 620, or various components thereof, may be an example of means for performing various aspects of storing parity during refresh operations as described herein. For example, the memory system controller 620 may include a reception component 625, a writing component 630, a refresh component 635, a determination component 640, a generation component 645, a logical operation component 650, an erasing component 655, or any combination thereof. Each of these components may communicate, directly or indirectly, with one another (e.g., via one or more buses).

The reception component 625 may be configured as or otherwise support a means for receiving a write command at a memory device from a host device, the write command including data. In some examples, the reception component 625 may be configured as or otherwise support a means for writing the data associated with the write command to a second set of memory cells of the memory device using a second type of write operation based at least in part on determining that the activity level of the interface satisfies the threshold.

In some examples, the reception component 625 may be configured as or otherwise support a means for receiving a second write command at the memory device from the host device, the second write command including second data.

The writing component 630 may be configured as or otherwise support a means for writing the data associated with the write command to a first set of memory cells of the memory device using a first type of write operation based at least in part on determining that an activity level of an interface between the memory device and the host device satisfies a threshold.

The refresh component 635 may be configured as or otherwise support a means for designating the second set of memory cells for a refresh operation based at least in part on writing the data to the second set of memory cells. In some examples, the refresh component 635 may be configured as or otherwise support a means for performing the refresh operation on the second set of memory cells based at least in part on determining that the activity level of the interface between the memory device and the host device does not satisfy the threshold.

In some examples, the refresh component 635 may be configured as or otherwise support a means for refraining from performing the refresh operation on the second set of memory cells for a duration based at least in part on designating the second set of memory cells for the refresh operation.

In some examples, the determination component 640 may be configured as or otherwise support a means for determining, after designating the second set of memory cells for the refresh operation, that the activity level of the interface between the memory device and the host device does not satisfy the threshold.

In some examples, the generation component 645 may be configured as or otherwise support a means for generating a fourth set of parity bits associated with the second data and writing the fourth set of parity bits to a third set of memory cells based at least in part on receiving the second write command.

In some examples, the logical operation component 650 may be configured as or otherwise support a means for performing a second logical operation on the second data and the fourth set of parity bits and third data and a fifth set of parity bits to generate a sixth set of parity bits based at least in part on generating the fourth set of parity bits.

In some examples, the erasing component 655 may be configured as or otherwise support a means for erasing the data associated with the write command from the first set of memory cells based at least in part on performing the refresh operation on the second set of memory cells.

In some examples, writing the data associated with the write command to the second set of memory cells includes generating a first set of parity bits associated with the data and writing the first set of parity bits to the second set of memory cells. In some examples, performing the refresh operation on the second set of memory cells includes. In some examples, performing a first logical operation on the data and the first set of parity bits and second data and a second set of parity bits to generate a third set of parity bits. In some examples, storing the third set of parity bits to the memory device.

In some examples, the first type of write operation is associated with writing a single bit of the data to each of the first set of memory cells and the second type of write operation is associated with writing multiple bits of the data to each of the second set of memory cells. In some examples, writing the data associated with the write command to the first set of memory cells and writing the data associated with the write command to the second set of memory cells occurs concurrently.

Figure 7:
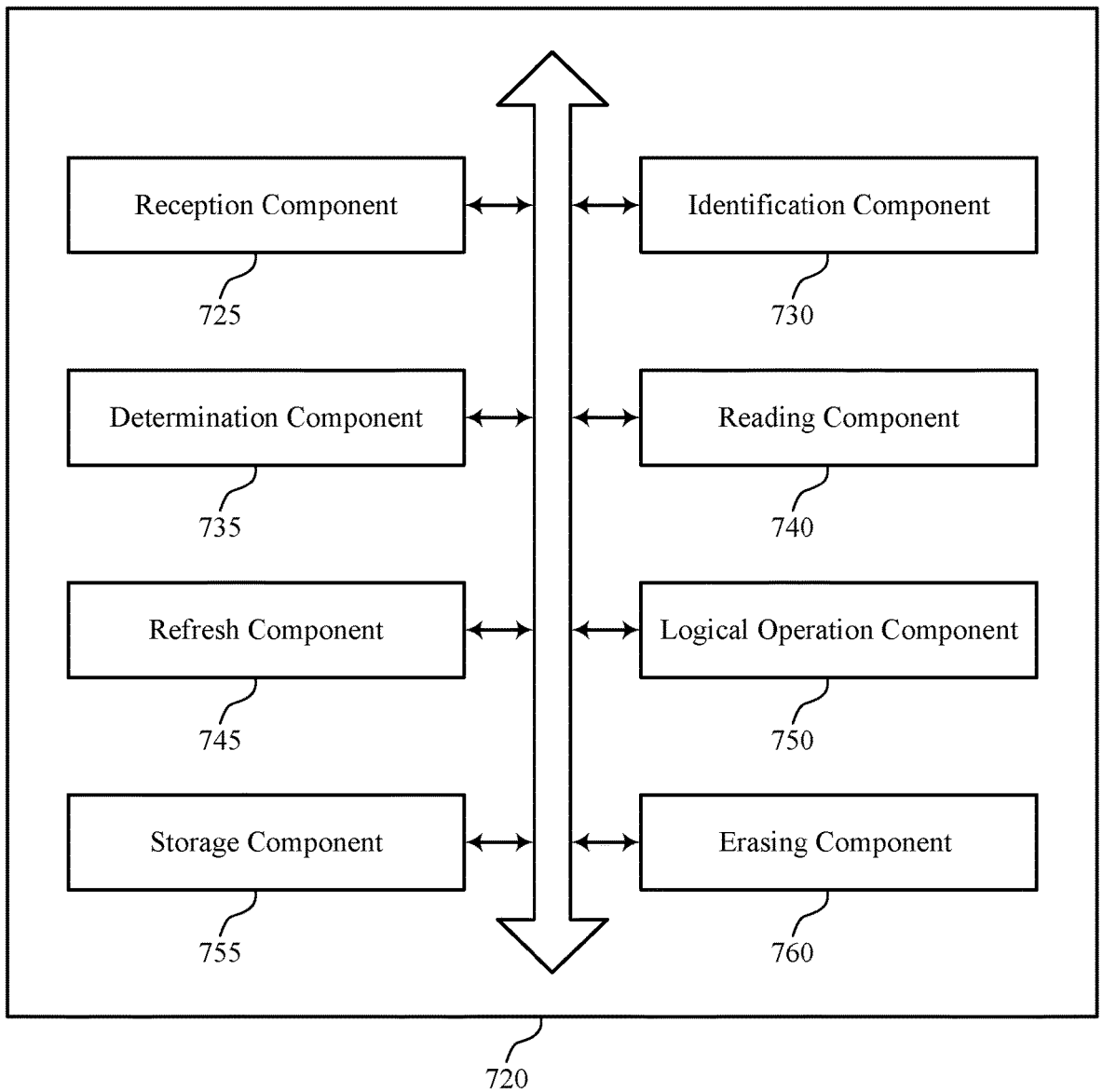
FIG. 7 shows a block diagram of a memory system controller that supports storing parity during refresh operations in accordance with examples as disclosed herein.

FIG. 7 shows a block diagram 700 of a memory system controller 720 that supports storing parity during refresh operations in accordance with examples as disclosed herein. The memory system controller 720 may be an example of aspects of a memory system controller as described with reference to FIGS. 1 through 5. The memory system controller 720, or various components thereof, may be an example of means for performing various aspects of storing parity during refresh operations as described herein. For example, the memory system controller 720 may include a reception component 725, an identification component 730, a determination component 735, a reading component 740, a refresh component 745, a logical operation component 750, a storage component 755, an erasing component 760, or any combination thereof. Each of these components may communicate, directly or indirectly, with one another (e.g., via one or more buses).

The reception component 725 may be configured as or otherwise support a means for receiving a read command at a memory device from a host device. In some examples, the reception component 725 may be configured as or otherwise support a means for receiving a second read command at the memory device from the host device.

The identification component 730 may be configured as or otherwise support a means for identifying a first block of memory cells storing data associated with the read command based at least in part on receiving the read command, where each memory cell of the first block of memory cells stores multiple bits of the data. In some examples, the identification component 730 may be configured as or otherwise support a means for identifying a third block of memory cells storing second data associated with the second read command based at least in part on receiving the second read command.

The determination component 735 may be configured as or otherwise support a means for determining whether a refresh operation has not been performed on the first block of memory cells within a duration based at least in part on identifying the first block of memory cells. In some examples, the determination component 735 may be configured as or otherwise support a means for determining that a second refresh operation has been performed on the third block of memory cells within a second duration based at least in part on identifying the third block of memory cells.

The reading component 740 may be configured as or otherwise support a means for reading the data associated with the read command from a second block of memory cells based at least in part on determining that the refresh operation has not been performed on the first block of memory cells within the duration, where each memory cell of the second block of memory cells stores a single bit of the data. In some examples, the reading component 740 may be configured as or otherwise support a means for reading the second data associated with the second read command and a first set of parity bits from the third block of memory cells based at least in part on determining that the second refresh operation has been performed on the third block of memory cells within the second duration.

In some examples, the refresh component 745 may be configured as or otherwise support a means for performing the refresh operation on the first block of memory cells after reading the data associated with the read command from the second block of memory cells, where performing the refresh operation includes.

In some examples, the logical operation component 750 may be configured as or otherwise support a means for performing a first logical operation on the data and a second set of parity bits to generate a third set of parity bits.

In some examples, the storage component 755 may be configured as or otherwise support a means for storing the third set of parity bits to a third block of memory cells.

In some examples, the erasing component 760 may be configured as or otherwise support a means for erasing the data associated with the read command from the second block of memory cells based at least in part on determining that a second refresh operation has been performed on the third block of memory cells within a second duration.

In some examples, the data stored to the first block of memory cells is associated with a fourth set of parity bits. In some examples, the data stored to the second block of memory cells is not associated with the fourth set of parity bits based at least in part on performing the refresh operation on the first block of memory cells.

Figure 8:
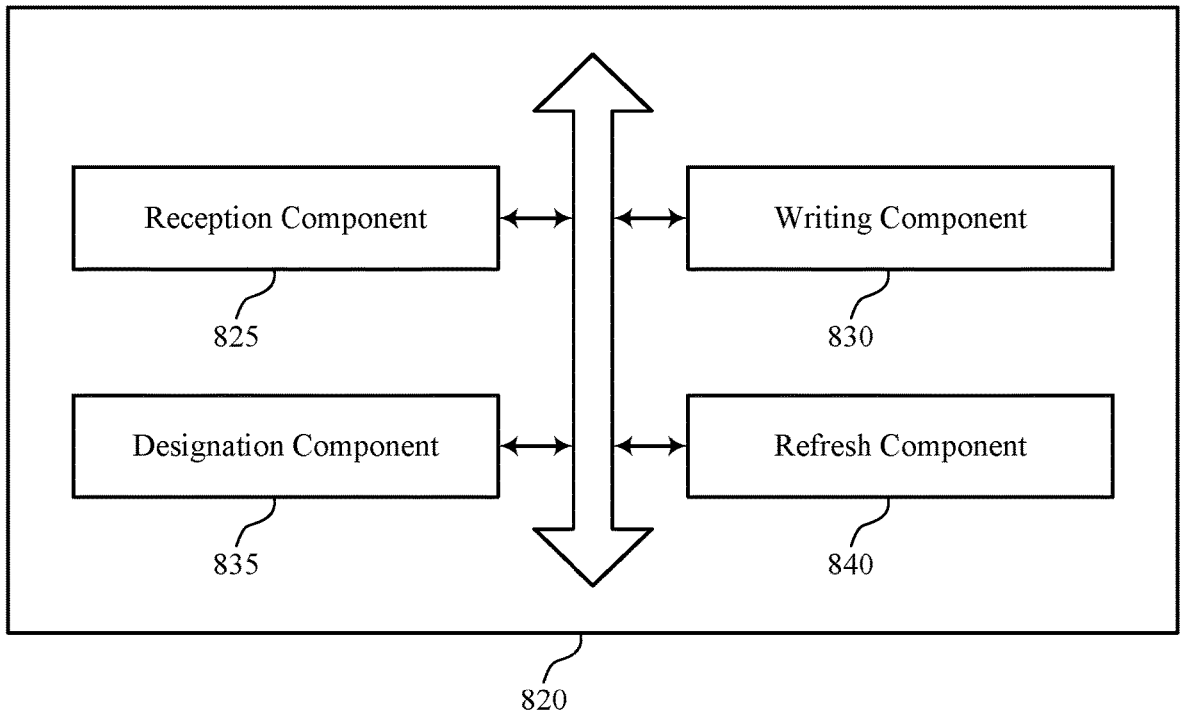
FIG. 8 shows a block diagram of a memory system controller that supports storing parity during refresh operations in accordance with examples as disclosed herein.

FIG. 8 shows a block diagram 800 of a memory system controller 820 that supports storing parity during refresh operations in accordance with examples as disclosed herein. The memory system controller 820 may be an example of aspects of a memory system controller as described with reference to FIGS. 1 through 5. The memory system controller 820, or various components thereof, may be an example of means for performing various aspects of storing parity during refresh operations as described herein. For example, the memory system controller 820 may include a reception component 825, a writing component 830, a designation component 835, a refresh component 840, or any combination thereof. Each of these components may communicate, directly or indirectly, with one another (e.g., via one or more buses).

The reception component 825 may be configured as or otherwise support a means for receiving a write command at a memory device from a host device, the write command including data.

The writing component 830 may be configured as or otherwise support a means for writing the data associated with the write command to a first set of memory cells of the memory device using a first type of write operation based at least in part on determining that an activity level of an interface between the memory device and the host device satisfies a threshold.

The designation component 835 may be configured as or otherwise support a means for designating the first set of memory cells for a refresh operation based at least in part on writing the data to the first set of memory cells.

The refresh component 840 may be configured as or otherwise support a means for performing the refresh operation on the first set of memory cells based at least in part on determining, after designating the first set of memory cells for the refresh operation, the activity level of the interface does not satisfy the threshold, where the refresh operation includes performing a first logical operation on at least the data and a first set of parity bits associated with the data and second data and a second set of parity bits to obtain a third set of parity bits, and storing the third set of parity bits to a second set of memory cells.

In some examples, the first type of write operation includes writing multiple bits of data to one or more memory cells of the first set of memory cells. In some examples, the first type of write operation includes writing a single bit of data to one or more memory cells of the first set of memory cells and writing two or more bits of data to one or more memory cells of the second set of memory cells.

Figure 9:
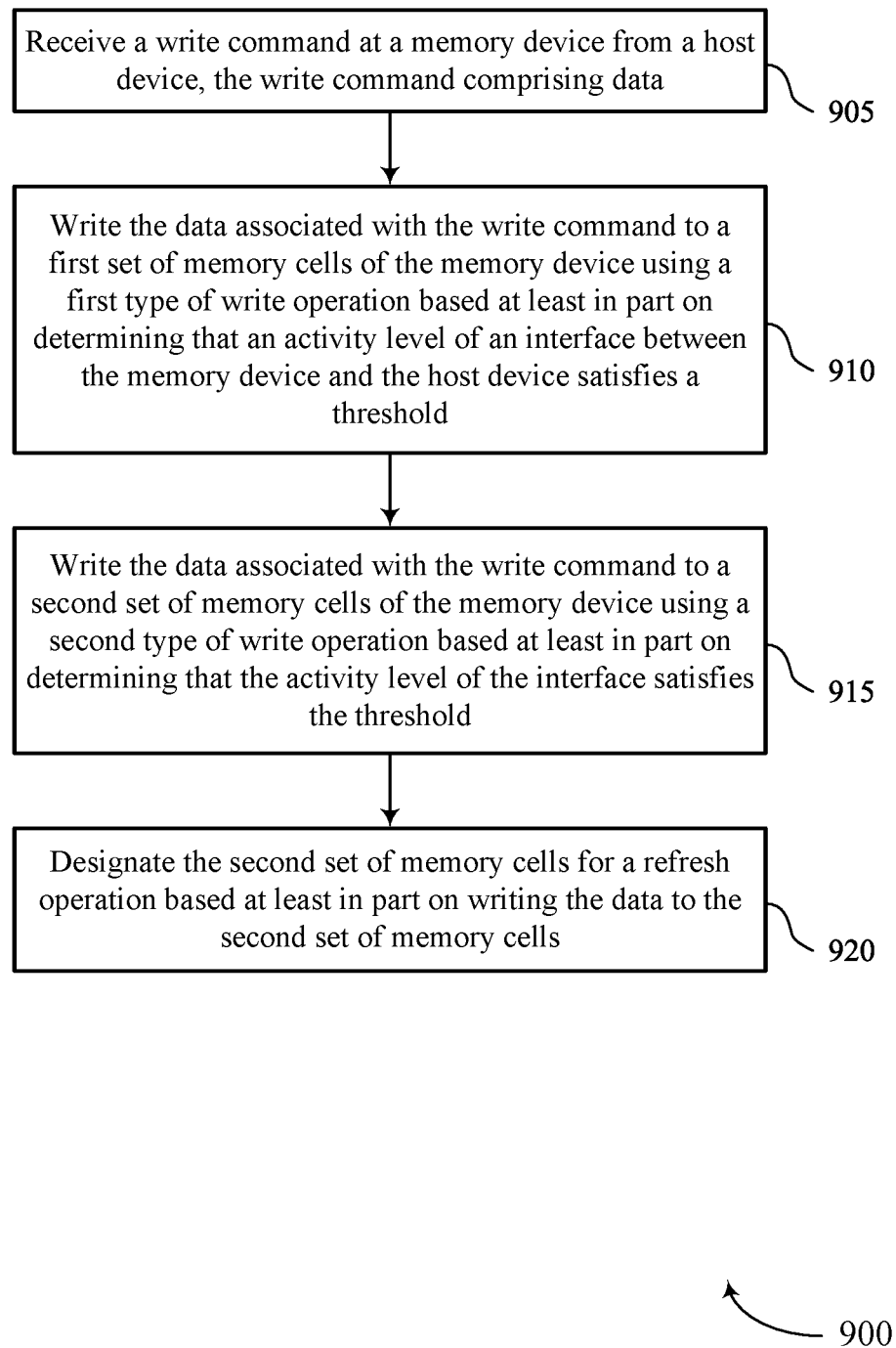
FIGS. 9 through 11 show flowcharts illustrating a method or methods that support storing parity during refresh operations in accordance with examples as disclosed herein.

FIG. 9 shows a flowchart illustrating a method 900 that supports storing parity during refresh operations in accordance with examples as disclosed herein. The operations of method 900 may be implemented by a memory system controller or its components as described herein. For example, the operations of method 900 may be performed by a memory system controller as described with reference to FIGS. 1 through 6. In some examples, a memory system controller may execute a set of instructions to control the functional elements of the device to perform the described functions. Additionally, or alternatively, the memory system controller may perform aspects of the described functions using special-purpose hardware.

At 905, the method may include receiving a write command at a memory device from a host device, the write command including data. The operations of 905 may be performed in accordance with examples as disclosed herein. In some examples, aspects of the operations of 905 may be performed by a reception component 625 as described with reference to FIG. 6.

At 910, the method may include writing the data associated with the write command to a first set of memory cells of the memory device using a first type of write operation based at least in part on determining that an activity level of an interface between the memory device and the host device satisfies a threshold. The operations of 910 may be performed in accordance with examples as disclosed herein. In some examples, aspects of the operations of 910 may be performed by a writing component 630 as described with reference to FIG. 6.

At 915, the method may include writing the data associated with the write command to a second set of memory cells of the memory device using a second type of write operation based at least in part on determining that the activity level of the interface satisfies the threshold. The operations of 915 may be performed in accordance with examples as disclosed herein. In some examples, aspects of the operations of 915 may be performed by a reception component 625 as described with reference to FIG. 6.

At 920, the method may include designating the second set of memory cells for a refresh operation based at least in part on writing the data to the second set of memory cells. The operations of 920 may be performed in accordance with examples as disclosed herein. In some examples, aspects of the operations of 920 may be performed by a refresh component 635 as described with reference to FIG. 6.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a write command at a memory device from a host device, the write command including data; writing the data associated with the write command to a first set of memory cells of the memory device using a first type of write operation based at least in part on determining that an activity level of an interface between the memory device and the host device satisfies a threshold; writing the data associated with the write command to a second set of memory cells of the memory device using a second type of write operation based at least in part on determining that the activity level of the interface satisfies the threshold; and designating the second set of memory cells for a refresh operation based at least in part on writing the data to the second set of memory cells.

Aspect 2: The method, apparatus, or non-transitory computer-readable medium of aspect 1, further including operations, features, circuitry, logic, means, or instructions, or any combination thereof for determining, after designating the second set of memory cells for the refresh operation, that the activity level of the interface between the memory device and the host device does not satisfy the threshold and performing the refresh operation on the second set of memory cells based at least in part on determining that the activity level of the interface between the memory device and the host device does not satisfy the threshold.

Aspect 3: The method, apparatus, or non-transitory computer-readable medium of aspect 2 where writing the data associated with the write command to the second set of memory cells includes generating a first set of parity bits associated with the data and writing the first set of parity bits to the second set of memory cells; performing the refresh operation on the second set of memory cells includes; performing a first logical operation on the data and the first set of parity bits and second data and a second set of parity bits to generate a third set of parity bits; and storing the third set of parity bits to the memory device.

Aspect 4: The method, apparatus, or non-transitory computer-readable medium of any of aspects 2 through 3, further including operations, features, circuitry, logic, means, or instructions, or any combination thereof for erasing the data associated with the write command from the first set of memory cells based at least in part on performing the refresh operation on the second set of memory cells.

Aspect 5: The method, apparatus, or non-transitory computer-readable medium of any of aspects 1 through 4, further including operations, features, circuitry, logic, means, or instructions, or any combination thereof for refraining from performing the refresh operation on the second set of memory cells for a duration based at least in part on designating the second set of memory cells for the refresh operation.

Aspect 6: The method, apparatus, or non-transitory computer-readable medium of any of aspects 1 through 5, further including operations, features, circuitry, logic, means, or instructions, or any combination thereof for receiving a second write command at the memory device from the host device, the second write command including second data; generating a fourth set of parity bits associated with the second data and writing the fourth set of parity bits to a third set of memory cells based at least in part on receiving the second write command; and performing a second logical operation on the second data and the fourth set of parity bits and third data and a fifth set of parity bits to generate a sixth set of parity bits based at least in part on generating the fourth set of parity bits.

Aspect 7: The method, apparatus, or non-transitory computer-readable medium of any of aspects 1 through 6 where the first type of write operation is associated with writing a single bit of the data to each of the first set of memory cells and the second type of write operation is associated with writing multiple bits of the data to each of the second set of memory cells.

Aspect 8: The method, apparatus, or non-transitory computer-readable medium of any of aspects 1 through 7 where writing the data associated with the write command to the first set of memory cells and writing the data associated with the write command to the second set of memory cells occurs concurrently.

Figure 10:
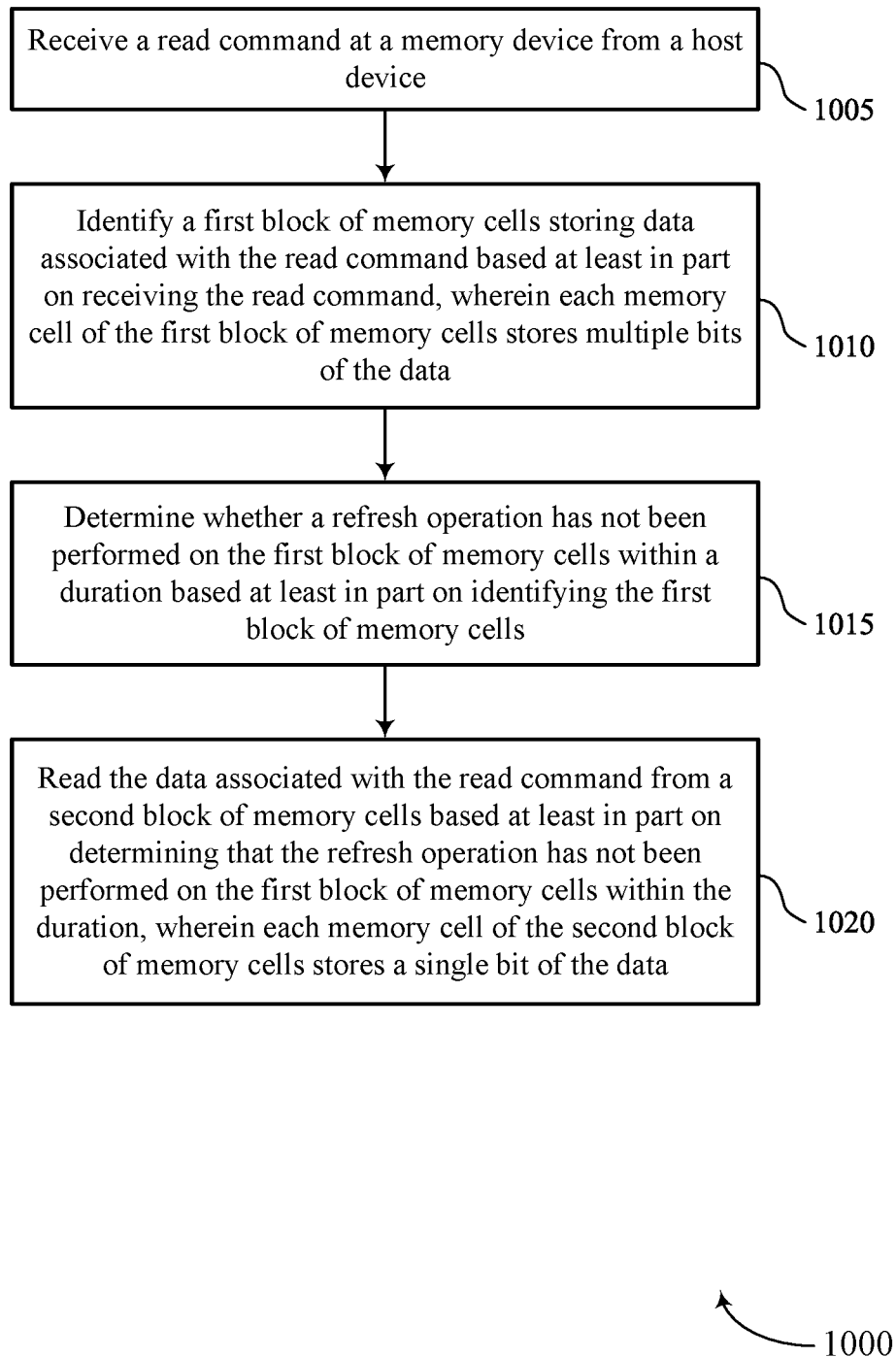

FIG. 10 shows a flowchart illustrating a method 1000 that supports storing parity during refresh operations in accordance with examples as disclosed herein. The operations of method 1000 may be implemented by a memory system controller or its components as described herein. For example, the operations of method 1000 may be performed by a memory system controller as described with reference to FIGS. 1 through 5 and 7. In some examples, a memory system controller may execute a set of instructions to control the functional elements of the device to perform the described functions. Additionally, or alternatively, the memory system controller may perform aspects of the described functions using special-purpose hardware.

At 1005, the method may include receiving a read command at a memory device from a host device. The operations of 1005 may be performed in accordance with examples as disclosed herein. In some examples, aspects of the operations of 1005 may be performed by a reception component 725 as described with reference to FIG. 7.

At 1010, the method may include identifying a first block of memory cells storing data associated with the read command based at least in part on receiving the read command, where each memory cell of the first block of memory cells stores multiple bits of the data. The operations of 1010 may be performed in accordance with examples as disclosed herein. In some examples, aspects of the operations of 1010 may be performed by an identification component 730 as described with reference to FIG. 7.

At 1015, the method may include determining whether a refresh operation has not been performed on the first block of memory cells within a duration based at least in part on identifying the first block of memory cells. The operations of 1015 may be performed in accordance with examples as disclosed herein. In some examples, aspects of the operations of 1015 may be performed by a determination component 735 as described with reference to FIG. 7.

At 1020, the method may include reading the data associated with the read command from a second block of memory cells based at least in part on determining that the refresh operation has not been performed on the first block of memory cells within the duration, where each memory cell of the second block of memory cells stores a single bit of the data. The operations of 1020 may be performed in accordance with examples as disclosed herein. In some examples, aspects of the operations of 1020 may be performed by a reading component 740 as described with reference to FIG. 7.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 9: A method, apparatus, or non-transitory computer-readable medium including operations, features, circuitry, logic, means, or instructions, or any combination thereof for receiving a read command at a memory device from a host device; identifying a first block of memory cells storing data associated with the read command based at least in part on receiving the read command, where each memory cell of the first block of memory cells stores multiple bits of the data; determining whether a refresh operation has not been performed on the first block of memory cells within a duration based at least in part on identifying the first block of memory cells; and reading the data associated with the read command from a second block of memory cells based at least in part on determining that the refresh operation has not been performed on the first block of memory cells within the duration, where each memory cell of the second block of memory cells stores a single bit of the data.

Aspect 10: The method, apparatus, or non-transitory computer-readable medium of aspect 9, further including operations, features, circuitry, logic, means, or instructions, or any combination thereof for receiving a second read command at the memory device from the host device; identifying a third block of memory cells storing second data associated with the second read command based at least in part on receiving the second read command; determining that a second refresh operation has been performed on the third block of memory cells within a second duration based at least in part on identifying the third block of memory cells; and reading the second data associated with the second read command and a first set of parity bits from the third block of memory cells based at least in part on determining that the second refresh operation has been performed on the third block of memory cells within the second duration.

Aspect 11: The method, apparatus, or non-transitory computer-readable medium of any of aspects 9 through 10, further including operations, features, circuitry, logic, means, or instructions, or any combination thereof for performing the refresh operation on the first block of memory cells after reading the data associated with the read command from the second block of memory cells, where performing the refresh operation includes; performing a first logical operation on the data and a second set of parity bits to generate a third set of parity bits; and storing the third set of parity bits to a third block of memory cells.

Aspect 12: The method, apparatus, or non-transitory computer-readable medium of aspect 11, further including operations, features, circuitry, logic, means, or instructions, or any combination thereof for erasing the data associated with the read command from the second block of memory cells based at least in part on determining that a second refresh operation has been performed on the third block of memory cells within a second duration.

Aspect 13: The method, apparatus, or non-transitory computer-readable medium of any of aspects 11 through 12 where the data stored to the first block of memory cells is associated with a fourth set of parity bits and the data stored to the second block of memory cells is not associated with the fourth set of parity bits based at least in part on performing the refresh operation on the first block of memory cells.

Figure 11:
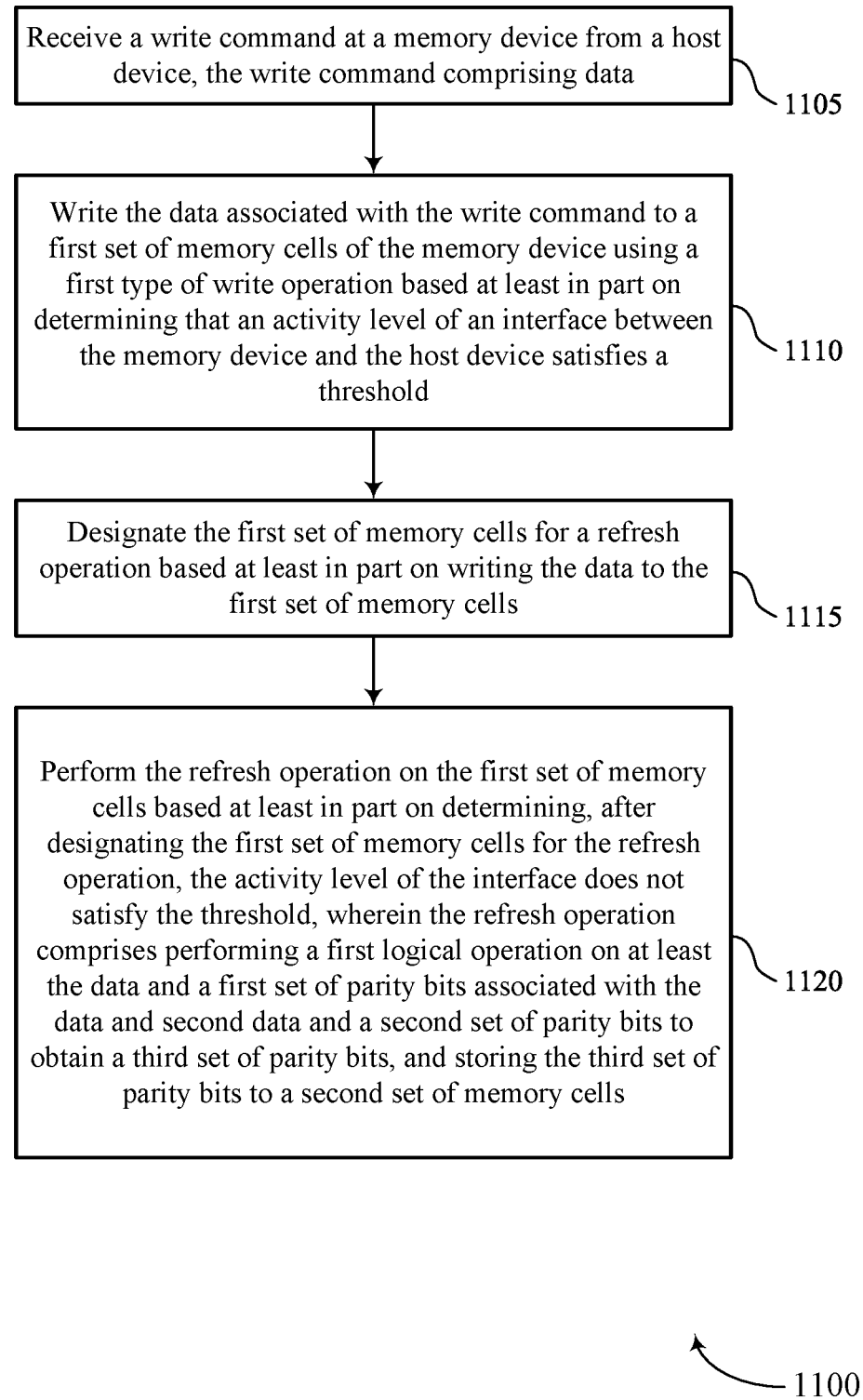

FIG. 11 shows a flowchart illustrating a method 1100 that supports storing parity during refresh operations in accordance with examples as disclosed herein. The operations of method 1100 may be implemented by a memory system controller or its components as described herein. For example, the operations of method 1100 may be performed by a memory system controller as described with reference to FIGS. 1 through 5 and 8. In some examples, a memory system controller may execute a set of instructions to control the functional elements of the device to perform the described functions. Additionally, or alternatively, the memory system controller may perform aspects of the described functions using special-purpose hardware.

At 1105, the method may include receiving a write command at a memory device from a host device, the write command including data. The operations of 1105 may be performed in accordance with examples as disclosed herein. In some examples, aspects of the operations of 1105 may be performed by a reception component 825 as described with reference to FIG. 8.

At 1110, the method may include writing the data associated with the write command to a first set of memory cells of the memory device using a first type of write operation based at least in part on determining that an activity level of an interface between the memory device and the host device satisfies a threshold. The operations of 1110 may be performed in accordance with examples as disclosed herein. In some examples, aspects of the operations of 1110 may be performed by a writing component 830 as described with reference to FIG. 8.

At 1115, the method may include designating the first set of memory cells for a refresh operation based at least in part on writing the data to the first set of memory cells. The operations of 1115 may be performed in accordance with examples as disclosed herein. In some examples, aspects of the operations of 1115 may be performed by a designation component 835 as described with reference to FIG. 8.

At 1120, the method may include performing the refresh operation on the first set of memory cells based at least in part on determining, after designating the first set of memory cells for the refresh operation, the activity level of the interface does not satisfy the threshold, where the refresh operation includes performing a first logical operation on at least the data and a first set of parity bits associated with the data and second data and a second set of parity bits to obtain a third set of parity bits, and storing the third set of parity bits to a second set of memory cells. The operations of 1120 may be performed in accordance with examples as disclosed herein. In some examples, aspects of the operations of 1120 may be performed by a refresh component 840 as described with reference to FIG. 8.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving a write command at a memory device from a host device, the write command including data; writing the data associated with the write command to a first set of memory cells of the memory device using a first type of write operation based at least in part on determining that an activity level of an interface between the memory device and the host device satisfies a threshold; designating the first set of memory cells for a refresh operation based at least in part on writing the data to the first set of memory cells; and performing the refresh operation on the first set of memory cells based at least in part on determining, after designating the first set of memory cells for the refresh operation, the activity level of the interface does not satisfy the threshold, where the refresh operation includes performing a first logical operation on at least the data and a first set of parity bits associated with the data and second data and a second set of parity bits to obtain a third set of parity bits, and storing the third set of parity bits to a second set of memory cells.

Aspect 15: The method, apparatus, or non-transitory computer-readable medium of aspect 14 where the first type of write operation includes writing multiple bits of data to one or more memory cells of the first set of memory cells.

Aspect 16: The method, apparatus, or non-transitory computer-readable medium of any of aspects 14 through 15 where the first type of write operation includes writing a single bit of data to one or more memory cells of the first set of memory cells and writing two or more bits of data to one or more memory cells of the second set of memory cells.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices comprising a first set of memory cells and a second set of memory cells;
   an interface coupled with the one or more memory devices; and
   processing circuitry associated with the one or more memory devices, wherein the processing circuitry is configured to cause the memory system to:
   receive a write command at the one or more memory devices from a host system, the write command associated with data;

write the data associated with the write command to the first set of memory cells of the one or more memory devices using a first type of write operation based at least in part on determining that an activity level of the interface between the one or more memory devices and the host system satisfies a threshold;

write the data associated with the write command to the second set of memory cells of the one or more memory devices using a second type of write operation based at least in part on determining that the activity level of the interface satisfies the threshold; and designate the second set of memory cells for a refresh operation based at least in part on writing the data to the second set of memory cells.

2. The memory system of claim 1, wherein the processing circuitry is further configured to cause the memory system to:

determine, after designating the second set of memory cells for the refresh operation, that the activity level of the interface between the one or more memory devices and the host system does not satisfy the threshold; and perform the refresh operation on the second set of memory cells based at least in part on determining that the activity level of the interface between the one or more memory devices and the host system does not satisfy the threshold.

3. The memory system of claim 2, wherein:

writing the data associated with the write command to the second set of memory cells comprises generating a first set of parity bits associated with the data and writing the first set of parity bits to the second set of memory cells; and performing the refresh operation on the second set of memory cells comprises:

performing a first logical operation on the data and the first set of parity bits and second data and a second set of parity bits to generate a third set of parity bits; and storing the third set of parity bits to the one or more memory devices.

4. The memory system of claim 2, wherein the processing circuitry is further configured to cause the memory system to:

erase the data associated with the write command from the first set of memory cells based at least in part on performing the refresh operation on the second set of memory cells.

5. The memory system of claim 1, wherein the processing circuitry is further configured to cause the memory system to:

refrain from performing the refresh operation on the second set of memory cells for a duration based at least in part on designating the second set of memory cells for the refresh operation.

6. The memory system of claim 1, wherein the one or more memory devices comprise a third set of memory cells, and wherein the processing circuitry is further configured to cause the memory system to:

receive a second write command at the one or more memory devices from the host system, the second write command comprising second data;

generate a fourth set of parity bits associated with the second data and writing the fourth set of parity bits to the third set of memory cells based at least in part on receiving the second write command; and perform a second logical operation on the second data and the fourth set of parity bits and third data and a fifth set of parity bits to generate a sixth set of parity bits based at least in part on generating the fourth set of parity bits.

7. The memory system of claim 1, wherein the first type of write operation is associated with writing a single bit of the data to each of the first set of memory cells and the second type of write operation is associated with writing multiple bits of the data to each of the second set of memory cells.

8. The memory system of claim 1, wherein writing the data associated with the write command to the first set of memory cells and writing the data associated with the write command to the second set of memory cells occurs concurrently.

9. A memory system, comprising:

one or more memory devices comprising a first block of memory cells and a second block of memory cells; and processing circuitry associated with the one or more memory devices, wherein the processing circuitry is configured to cause the memory system to:

receive a read command at the one or more memory devices from a host system;

identify the first block of memory cells storing data associated with the read command based at least in part on receiving the read command, wherein each memory cell of the first block of memory cells stores multiple bits of the data;

determine whether a refresh operation has not been performed on the first block of memory cells within a duration based at least in part on identifying the first block of memory cells; and read the data associated with the read command from the second block of memory cells based at least in part on determining that the refresh operation has not been performed on the first block of memory cells within the duration, wherein each memory cell of the second block of memory cells stores a single bit of the data.

10. The memory system of claim 9, wherein the one or more memory devices comprises a third block of memory cells, and wherein the processing circuitry is further configured to cause the memory system to:

receive a second read command at the one or more memory devices from the host system;

identify the third block of memory cells storing second data associated with the second read command based at least in part on receiving the second read command;

determine that a second refresh operation has been performed on the third block of memory cells within a second duration based at least in part on identifying the third block of memory cells; and read the second data associated with the second read command and a first set of parity bits from the third block of memory cells based at least in part on determining that the second refresh operation has been performed on the third block of memory cells within the second duration.

11. The memory system of claim 9, wherein the one or more memory devices comprise a third block of memory cells, and wherein the processing circuitry is further configured to cause the memory system to:

perform the refresh operation on the first block of memory cells after reading the data associated with the read command from the second block of memory cells, wherein performing the refresh operation comprises:

perform a first logical operation on the data and a second set of parity bits to generate a third set of parity bits; and
store the third set of parity bits to the third block of memory cells.

12. The memory system of claim 11, wherein the processing circuitry is further configured to cause the memory system to:
erase the data associated with the read command from the second block of memory cells based at least in part on determining that a second refresh operation has been performed on the third block of memory cells within a second duration.

13. The memory system of claim 11, wherein:
the data stored to the first block of memory cells is associated with a fourth set of parity bits; and
the data stored to the second block of memory cells is not associated with the fourth set of parity bits based at least in part on performing the refresh operation on the first block of memory cells.

14. A memory system, comprising:
one or more memory devices comprising a first set of memory cells and a second set of memory cells;
an interface coupled with the one or more memory devices; and
processing circuitry associated with the one or more memory devices, wherein the processing circuitry is configured to cause the memory system to:
receive a write command at the one or more memory devices from a host system, the write command associated with data;
write the data associated with the write command to the first set of memory cells of the one or more memory devices using a first type of write operation based at least in part on determining that an activity level of the interface between the one or more memory devices and the host system satisfies a threshold;
designate the first set of memory cells for a refresh operation based at least in part on writing the data to the first set of memory cells; and
perform the refresh operation on the first set of memory cells based at least in part on determining, after designating the first set of memory cells for the refresh operation, the activity level of the interface does not satisfy the threshold, wherein the refresh operation comprises performing a first logical operation on at least the data and a first set of parity bits associated with the data and second data and a second set of parity bits to obtain a third set of parity bits, and storing the third set of parity bits to the second set of memory cells.

15. The memory system of claim 14, wherein the first type of write operation comprises writing multiple bits of data to one or more memory cells of the first set of memory cells.

16. The memory system of claim 14, wherein the first type of write operation comprises writing a single bit of data to one or more memory cells of the first set of memory cells and writing two or more bits of data to one or more memory cells of the second set of memory cells.

17. A non-transitory computer-readable medium storing code comprising instructions which, when executed by processing circuitry of an electronic device, cause the electronic device to:
receive a write command at one or more memory devices from a host system, the write command associated with data;
write the data associated with the write command to a first set of memory cells of the one or more memory devices using a first type of write operation based at least in part on determining that an activity level of an interface between the one or more memory devices and the host system satisfies a threshold;
write the data associated with the write command to a second set of memory cells of the one or more memory devices using a second type of write operation based at least in part on determining that the activity level of the interface satisfies the threshold; and
designate the second set of memory cells for a refresh operation based at least in part on writing the data to the second set of memory cells.

18. The non-transitory computer-readable medium of claim 17, wherein the instructions, when executed by the processing circuitry of the electronic device, further cause the electronic device to:
determine, after designating the second set of memory cells for the refresh operation, that the activity level of the interface between the one or more memory devices and the host system does not satisfy the threshold; and
perform the refresh operation on the second set of memory cells based at least in part on determining that the activity level of the interface between the one or more memory devices and the host system does not satisfy the threshold.

19. The non-transitory computer-readable medium of claim 18, wherein:
writing the data associated with the write command to the second set of memory cells comprises generating a first set of parity bits associated with the data and writing the first set of parity bits to the second set of memory cells; and
performing the refresh operation on the second set of memory cells comprises:
performing a first logical operation on the data and the first set of parity bits and second data and a second set of parity bits to generate a third set of parity bits; and
storing the third set of parity bits to the one or more memory devices.

20. The non-transitory computer-readable medium of claim 18, wherein the instructions, when executed by the processing circuitry of the electronic device, further cause the electronic device to:
erase the data associated with the write command from the first set of memory cells based at least in part on performing the refresh operation on the second set of memory cells.

21. The non-transitory computer-readable medium of claim 17, wherein the instructions, when executed by the processing circuitry of the electronic device, further cause the electronic device to:
refrain from performing the refresh operation on the second set of memory cells for a duration based at least in part on designating the second set of memory cells for the refresh operation.

22. The non-transitory computer-readable medium of claim 17, wherein the instructions, when executed by the processing circuitry of the electronic device, further cause the electronic device to:
receive a second write command at the one or more memory devices from the host system, the second write command comprising second data;
generate a fourth set of parity bits associated with the second data and writing the fourth set of parity bits to a third set of memory cells based at least in part on receiving the second write command; and perform a second logical operation on the second data and the fourth set of parity bits and third data and a fifth set of parity bits to generate a sixth set of parity bits based at least in part on generating the fourth set of parity bits.

23. The non-transitory computer-readable medium of claim 17, wherein the first type of write operation is associated with writing a single bit of the data to each of the first set of memory cells and the second type of write operation is associated with writing multiple bits of the data to each of the second set of memory cells.

24. The non-transitory computer-readable medium of claim 17, wherein writing the data associated with the write command to the first set of memory cells and writing the data associated with the write command to the second set of memory cells occurs concurrently.

* * * * *